US012291976B2

(12) United States Patent
Breining et al.

(10) Patent No.: US 12,291,976 B2
(45) Date of Patent: May 6, 2025

(54) ROTOR WHEEL FOR AN AIRCRAFT TURBINE ENGINE

(71) Applicant: SAFRAN HELICOPTER ENGINES, Bordes (FR)

(72) Inventors: Jean-Luc Breining, Moissy-Cramayel (FR); Denis Daniel Jean Boisseleau, Moissy-Cramayel (FR); Thomas Gabriel Elie Gatteau, Moissy-Cramayel (FR); Yvan Ludovic Lameignere, Moissy-Cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 0 days.

(21) Appl. No.: 18/566,972

(22) PCT Filed: May 31, 2022

(86) PCT No.: PCT/FR2022/051034
§ 371 (c)(1),
(2) Date: Dec. 4, 2023

(87) PCT Pub. No.: WO2022/258911
PCT Pub. Date: Dec. 15, 2022

(65) Prior Publication Data

US 2024/0263559 A1 Aug. 8, 2024

(30) Foreign Application Priority Data

Jun. 8, 2021 (FR) ....................................... 2106011

(51) Int. Cl.
*F01D 5/30* (2006.01)
*F01D 5/32* (2006.01)
*F01D 11/00* (2006.01)

(52) U.S. Cl.
CPC ........... *F01D 5/3007* (2013.01); *F01D 5/326* (2013.01); *F01D 11/006* (2013.01); *F05D 2220/323* (2013.01); *F05D 2260/30* (2013.01)

(58) Field of Classification Search
CPC .... F01D 5/3007; F01D 5/3015; F01D 5/3069; F01D 5/32; F01D 5/326; F01D 11/006
See application file for complete search history.

(56) References Cited

U.S. PATENT DOCUMENTS 2,755,062 A 7/1956 Hill
5,302,086 A * 4/1994 Kulesa .................. F01D 5/3007 416/221

(Continued)

FOREIGN PATENT DOCUMENTS

EP 3 594 450 A1 1/2020
EP 647 545 A1 5/2020

(Continued)

OTHER PUBLICATIONS

International Search Report mailed Jul. 21, 2022, issued in corresponding International Application No. PCT/FR2022/051034, filed May 31, 2022, 7 pages.

(Continued)

*Primary Examiner* — Christopher Verdier
(74) *Attorney, Agent, or Firm* — CHRISTENSEN O'CONNOR JOHNSON KINDNESS PLLC

(57) ABSTRACT

A rotor wheel for an aircraft turbine engine has a disc with a main axis and cells at its outer periphery. The cells extend along the axis, and each has a bottom and two side flanks. Vanes are mounted in the cells of the disc, each vane including a blade connected by a platform to a root mounted in one of the cells. Each root includes, at its radially inner end, a lobe with a first axial end having a circumferential notch and a second axial end having a radially inward facing stop configured to axially bear on a first face of the disc. An (Continued)

annular ring engages the notches of the vanes and is axially clamped against a second face of the disc. Each lobe has a radially inward facing projecting bulb configured to radially bear on the surface of the bottom of the corresponding cell.

8 Claims, 8 Drawing Sheets

(56) References Cited

U.S. PATENT DOCUMENTS

| | | | | |
|---|---|---|---|---|
| 2010/0178169 | A1* | 7/2010 | Webb | F04D 29/083 416/95 |
| 2012/0201681 | A1* | 8/2012 | Chauveau | F01D 5/326 416/204 A |
| 2020/0011188 | A1* | 1/2020 | Mekeresz | F01D 5/3007 |
| 2020/0131916 | A1* | 4/2020 | Eastwood | F01D 5/3007 |

FOREIGN PATENT DOCUMENTS

| | | | |
|---|---|---|---|
| FR | 951 224 | A1 | 4/2011 |
| FR | 3 043 133 | A1 | 5/2017 |
| FR | 049 643 | A1 | 10/2017 |
| GB | 2 452 515 | A | 3/2009 |

OTHER PUBLICATIONS

Written Opinion mailed Jul. 21, 2022, issued in corresponding International Application No. PCT/FR2022/051034, filed May 31, 2022, 5 pages.

* cited by examiner

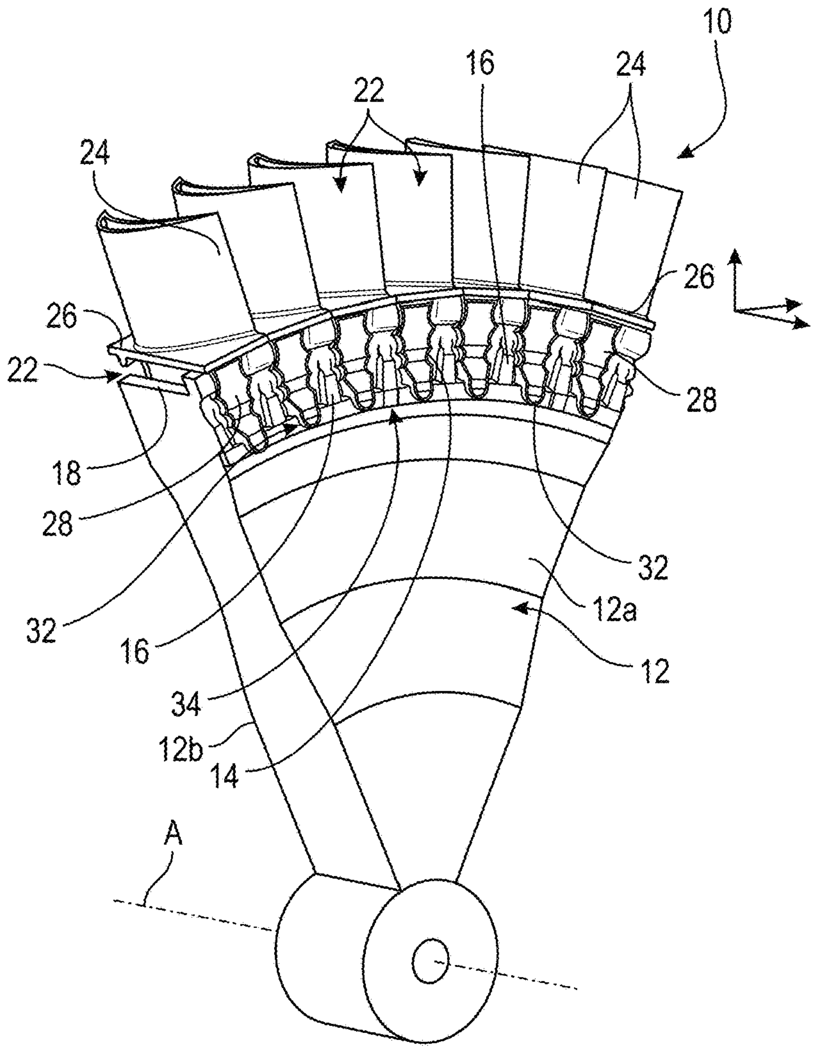
FIG. 1 -- Prior Art --
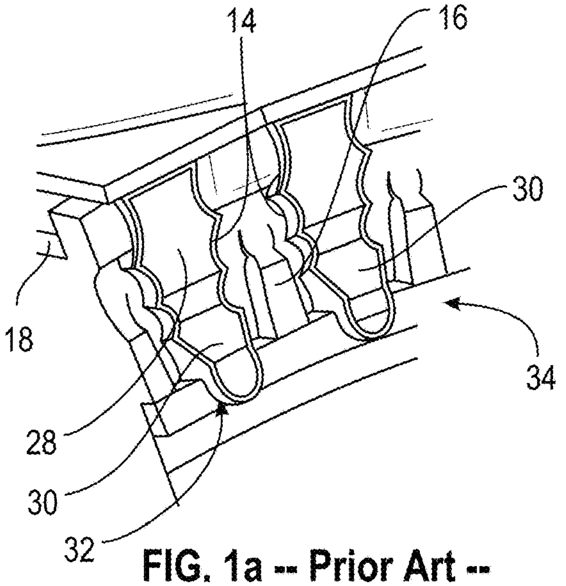
FIG. 1a -- Prior Art --

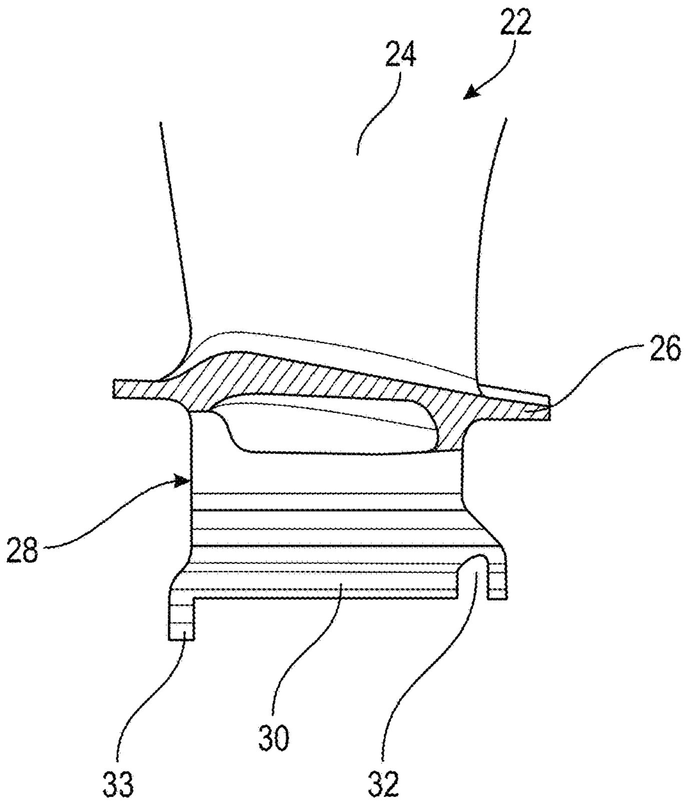
FIG. 2 -- Prior Art --
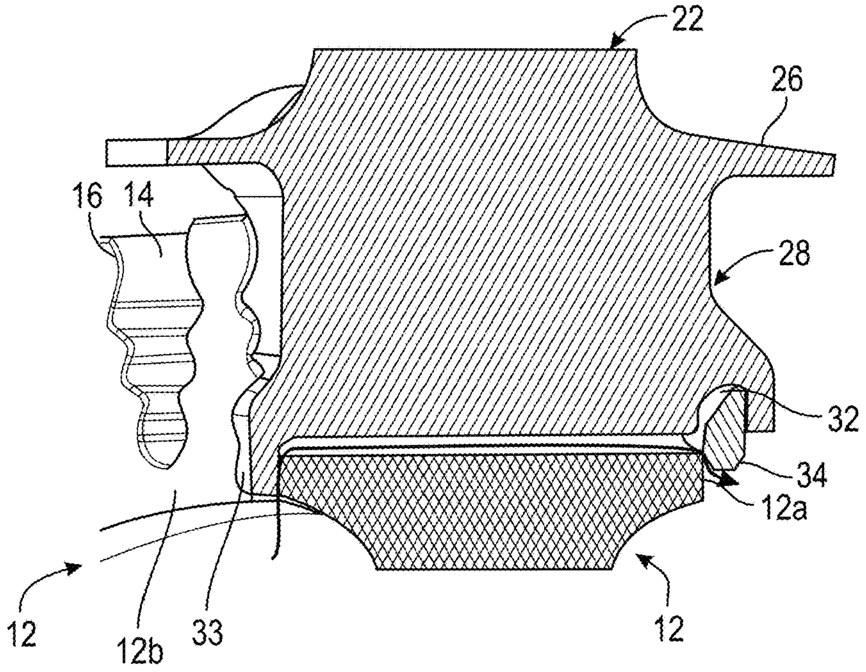
FIG. 3 -- Prior Art --

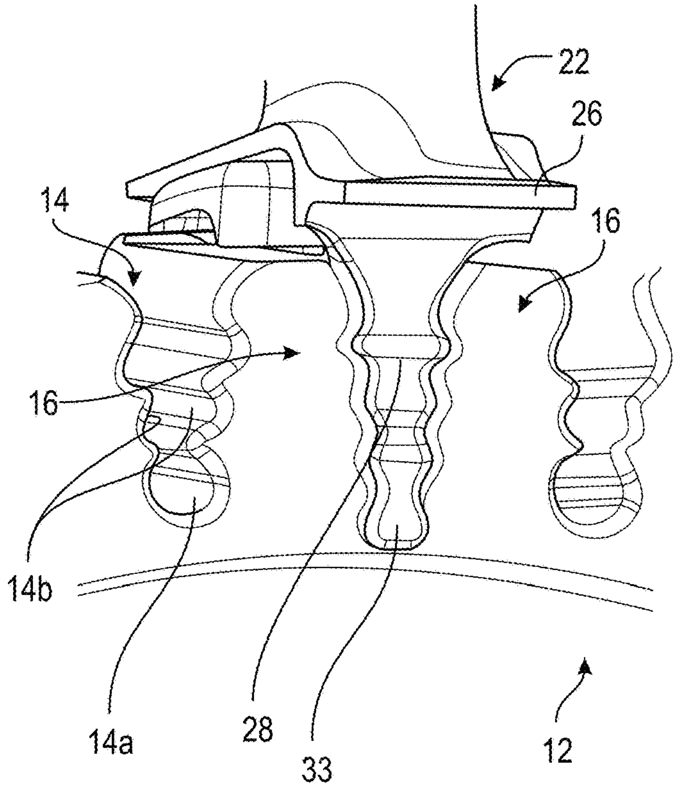
FIG. 4 -- Prior Art --
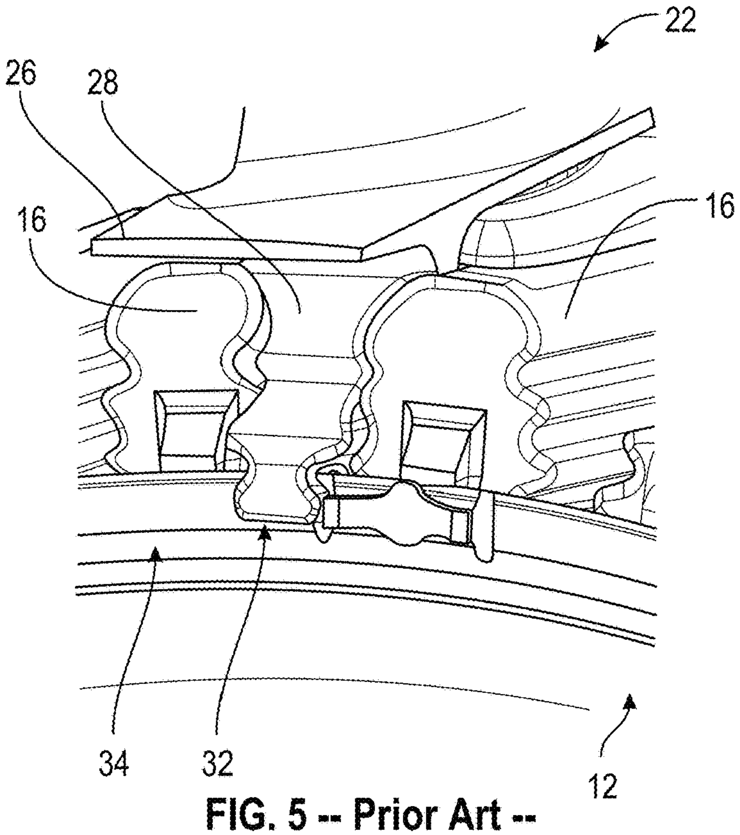
FIG. 5 -- Prior Art --

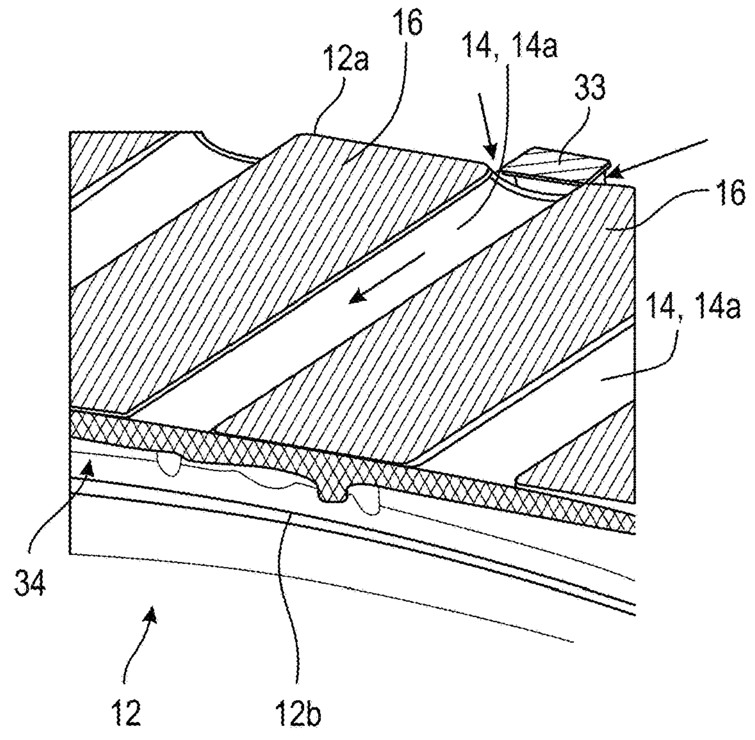
FIG. 6 -- Prior Art --
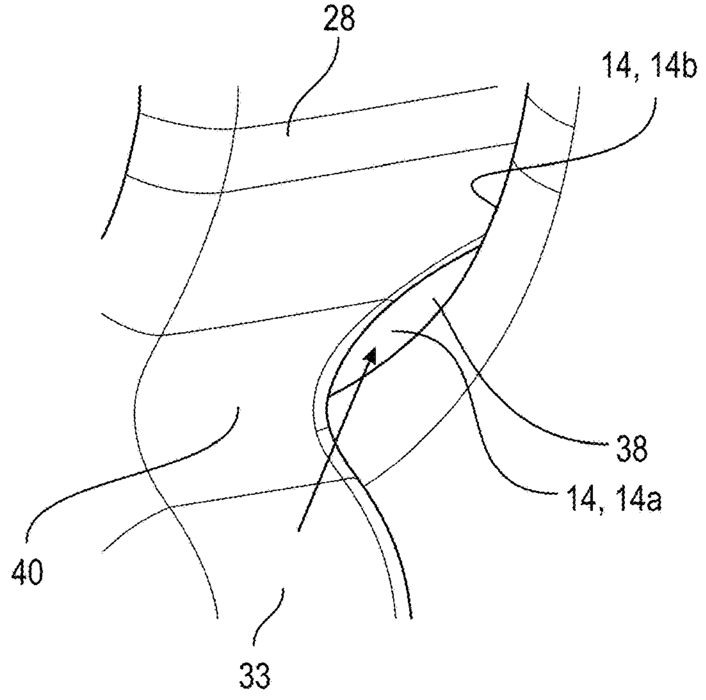
FIG. 7 -- Prior Art --

ROTOR WHEEL FOR AN AIRCRAFT TURBINE ENGINE

FIELD OF THE DISCLOSURE

This disclosure relates to a rotor wheel for an aircraft turbine engine.

BACKGROUND

The technical background comprises in particular the documents FR-A1-2 951 224, FR-A1-3 049 643, U.S. Pat. No. 2,755,062, EP-A1-3 594 450, EP-A1-3 647 545, FR-A1-3 043 133 and GB-A-2 452 515.

A rotor wheel 10, such as that shown partially in FIG. 1, comprises a disc 12 which has a main axis A representing the axis of rotation of the wheel, and which comprises slots 14 at its external periphery.

The slots 14 extend along the axis A and may be parallel to this axis or inclined with respect to the axis A. They are separated from each other by teeth 16 of the disc, these teeth also being referred to as "inter-blades". The slots 14 are generally formed by broaching or electro-erosion and have a general dovetail or fir tree shape (with one or more lobes). Their axes along the axis A are referred to as broaching axes. Each of the slots 14 comprises a bottom located between two lateral flanks.

The rotor wheel 10 also comprises vanes 22 which are mounted in the slots 14 of the disc 12. Each vane 22 comprises a blade 24 connected by a platform 26 to a root 28 which is configured to be mounted in a form-fitting manner in one of the slots 14. Each of the teeth 16 on the disc comprises, at its radially external end, a summit 18 covered by the platforms 26 of two adjacent vanes 22.

The root 28 of each vane 22 comprises a lobe 30 at its radially internal end, a first axial end of which comprises a circumferential notch 32 and a second axial end of which, opposite the first axial end, comprises a radially inwardly directed cleat 33 or hook (see FIG. 2).

The rotor wheel 10 also comprises an split annular ring 34 engaged in the notches 32 in the vanes and pressed axially against the disc 12.

FIGS. 3 to 7 are detail views of a rotor wheel 10 in the prior art.

These figures show that, when the ring 34 is engaged in the notches 32 in the vanes, these vanes 22 are intended to rest on the disc 12 via their cleats 33. The ring 34 rests axially on one face 12*a* of the disc 12, and the cleats 33 rest axially on the opposite face 12*b* of the disc. In theory, this axial support is provided by the assembly of the ring 34.

Each of the vanes 22 is mounted on the external periphery of the disc 12 by a "slide" connection. Once fitted, the vanes 22 must be held axially on the disc 12 and the ring 34 ensures this immobilisation. It is also important to ensure that this connection is watertight, in particular to prevent gases from the duct of the rotor from flowing through this connection.

In the assembly described above, the axial support of the cleats 33 of the vanes 22 on the disc 12 allows to ensure a sealing in this area between the vanes 22 and the slots 14 of the disc. This sealing is of the axial type insofar as it is ensured by support in the axial direction, i.e. parallel to the axis A of the wheel or to the broaching axes of the slots.

However, in practice, as a result of assembly clearances and thermomechanical and vibratory stresses during operation, the vanes 22 may move axially (by a few tenths of a millimetre) and their cleats 33 may no longer bear axially against the disc 12, even if this support is favoured by the flow of gases in the duct.

The axial sealing in the region of the cleat 33 of each vane 22 is thus no longer ensured. This phenomenon is accentuated because of the connections 38 between the flanks 14*b* and the bottom 14*a* of the slots 14, and the connections 40 between the cleat 33 and the sides of the root, which are designed to ensure that the cleat 33 rests axially against the disc 12.

FIGS. 6 and 7 illustrate the leakage of the sliding connection in this area. These leaks introduce a bias into the model of the initial air system, leading to a drop in rotor efficiency and a deviation in the temperature at the summit of the disc.

The present disclosure proposes a solution to this problem that is simple, effective and economical.

SUMMARY

The object of the present disclosure is a rotor wheel for an aircraft turbine engine, this wheel comprising:

- a disc having a main axis and having slots at its external periphery, the slots extending along the axis and each comprising a bottom and two lateral flanks,
- vanes mounted in the slots of the disc, each of these vanes comprising a blade connected by a platform to a root which is configured to be mounted in a form-fitting manner in one of the slots, the root of each of the vanes comprising, at its radially internal end, a lobe, a first axial end of which comprises a circumferential notch and a second axial end of which, opposite the first end, comprises a cleat oriented radially inwards and configured to bear axially against a first face of the disc, and
- a split annular ring engaged in the notches of the vanes and pressed axially against a second face of the disc, the second face being opposite the first face,
- characterised in that the lobe of the root of each of the vanes comprises, between the first and second ends, a projecting bulb which is oriented radially inwards and configured to bear radially on the surface against the bottom of the corresponding slot.

According to the disclosure, although the cleat of each vane can provide a sealing in this area by bearing axially on the disc, the additional bulb of the root of each vane is also configured to bear radially on the bottom of the slot receiving the root in order to provide a sealing in this area by this radial bearing. In operation, whatever the axial position of the vane in relation to the disc, and even if the cleat is not bearing axially on the disc, the bulb remains bearing radially on the bottom of the slot, which maintains and guarantees the sealing in this area.

In the present application, "radial support" means that two elements are radially supported on each other or that these two elements are fitted on each other in the radial direction. "Adjusted" or "fit" means that there is no clearance in the radial direction between these elements. During operation, the centrifugal forces push the vanes radially outwards, so that they may no longer rest radially on the bottoms of the slots, but instead be fitted tightly to the bottoms.

In the present application, "surface bearing" or "sealed bearing" means the fact that an element or a surface bears on another element or another surface with at least three points of contact, this bearing being configured to provide a sealing between these elements or these surfaces.

The wheel according to the disclosure may also have one or more of the following characteristics, taken alone or in combination with each other:

the bulb has in cross-section a shape complementary to a cross-section of a portion of the slot in which it is located.

the bulb has an axial position Pb on the lobe, measured along the axis and from the face of the disc on which the vane cleat bears, such that:

$$(p/k)_1 < Pb < (p/k)_2$$

with p the axial position of the bulb on the vane root, k is the axial length of the vane root, $(p/k)_1$ is greater than or equal to 0.1, preferably greater than or equal to 0.7, and $(p/k)_2$ is less than or equal to 0.9, and preferably less than or equal to 0.3, the bulb has an axial position Pb such that it is closer to the first end than to the second end, the bulb has an axial length Lb such that:

$$0.1 \times Ld < Lb < 0.9 \times Ld$$

with

Ld the broaching length of the disc, which is equal to the maximum length of a slot, the bulb has in cross-section an area Sb such that:

$$0.01 \times (St-Sr) < Sb < 0.9 \times (St-Sr)$$

with

St=the total area of a cross-section of a slot of the disc, and

Sr=the area of a cross-section of the root outside to the bulb without passing through the bulb, the bulb comprises two radial faces, upstream and downstream respectively, which are connected together by a convex curved face complementary to the bottom of the slot, the downstream radial face of the bulb is connected by an inclined face to the notch, and the blade of each vane comprises a heel.

The present disclosure also relates to a turbine engine, in particular an aircraft turbine engine, comprising at least one rotor wheel as described above.

DESCRIPTION OF THE DRAWINGS

Further characteristics and advantages of the disclosure will become apparent from the following detailed description, for the understanding of which reference is made to the attached drawings in which:

FIG. 1 is a partial schematic perspective view of a rotor wheel of an aircraft turbine engine;

FIG. 1*a* is a larger scale view of a portion of FIG. 1;

FIG. 2 is a schematic partial perspective view of a rotor vane;

FIG. 3 is a schematic partial perspective view of a rotor wheel in axial section, the section passing through the root of a vane;

FIG. 4 is a schematic partial perspective view of a rotor wheel, seen from the upstream side;

FIG. 5 is a schematic partial perspective view of a rotor wheel, seen from the downstream side;

FIG. 6 is a partial schematic view of a rotor wheel in perspective and in cross-section, and shows the passage cross-section around the bottom of a slot of the disc;

FIG. 7 is a partial schematic perspective view of the passage cross-section between a cleat at the root of a vane and the disc;

DETAILED DESCRIPTION

FIGS. 1 to 7 have been described above and allow to illustrate the context of the disclosure, one embodiment of which is illustrated in FIGS. 8 to 13.

Figure 11:
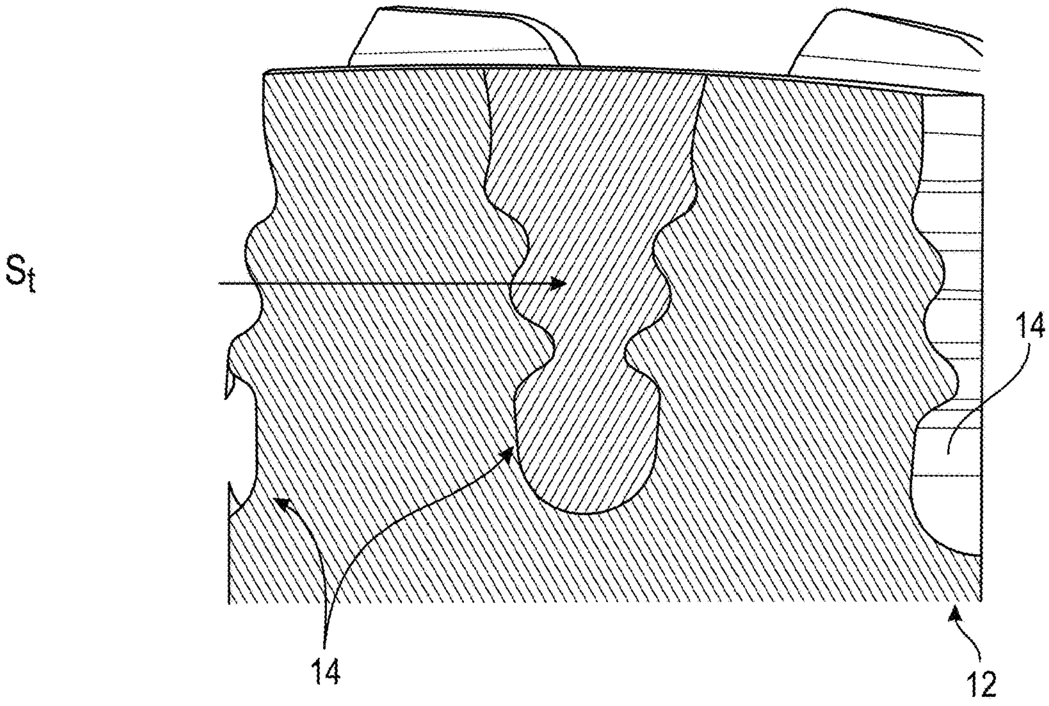
FIG. 11 is a schematic partial perspective view of a disc and shows the cross-sectional area of one of its slots.
Figure 13:
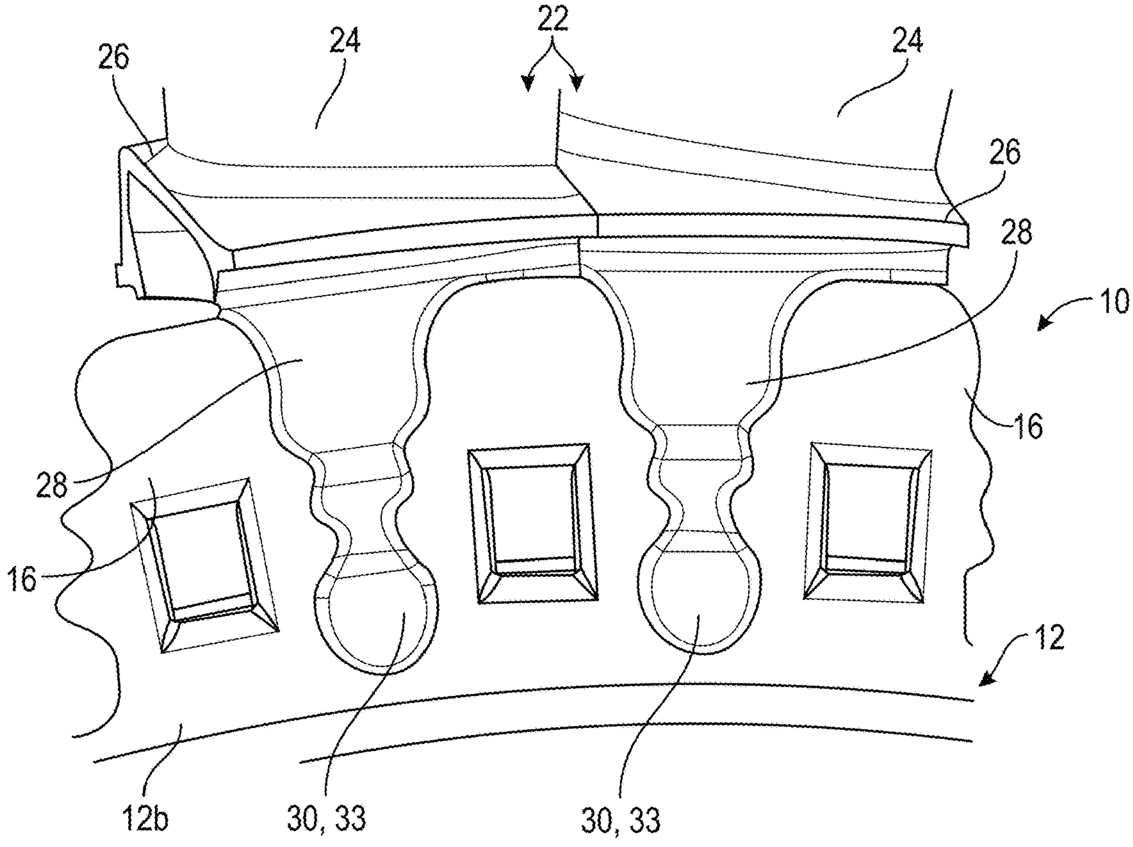
FIG. 13 is a schematic partial perspective view of a rotor wheel and shows a vanishing line between the root of a vane and a slot of the disc.

The disclosure relates to a rotor wheel 10 which is shown in part in FIGS. 11 and 13. This wheel 10 comprises a disc 12 which, as in FIG. 1, has a main axis A (not visible) representing the axis of rotation of the wheel.

The disc 12 comprises slots 14 at its external periphery. The slots 14 extend along the axis A and are separated from each other by teeth 16. The slots 14 are generally formed by broaching or electrical discharge machining (EDM) and have a general dovetail or fir tree shape (with one or more lobes). Each of the slots 14 comprises a bottom 14*a* located between two lateral flanks 14*b*.

Each of the teeth 16 on the disc comprises a summit 18 at its radially external end.

The rotor wheel 10 also comprises vanes 22 which are mounted in the slots 14 of the disc 12. Each vane 22 comprises a blade 24 connected by a platform 26 to a root 28 which is configured to be mounted in a form-fitting manner in one of the slots 14. Each vane 22 may also comprise a heel.

Figure 8:
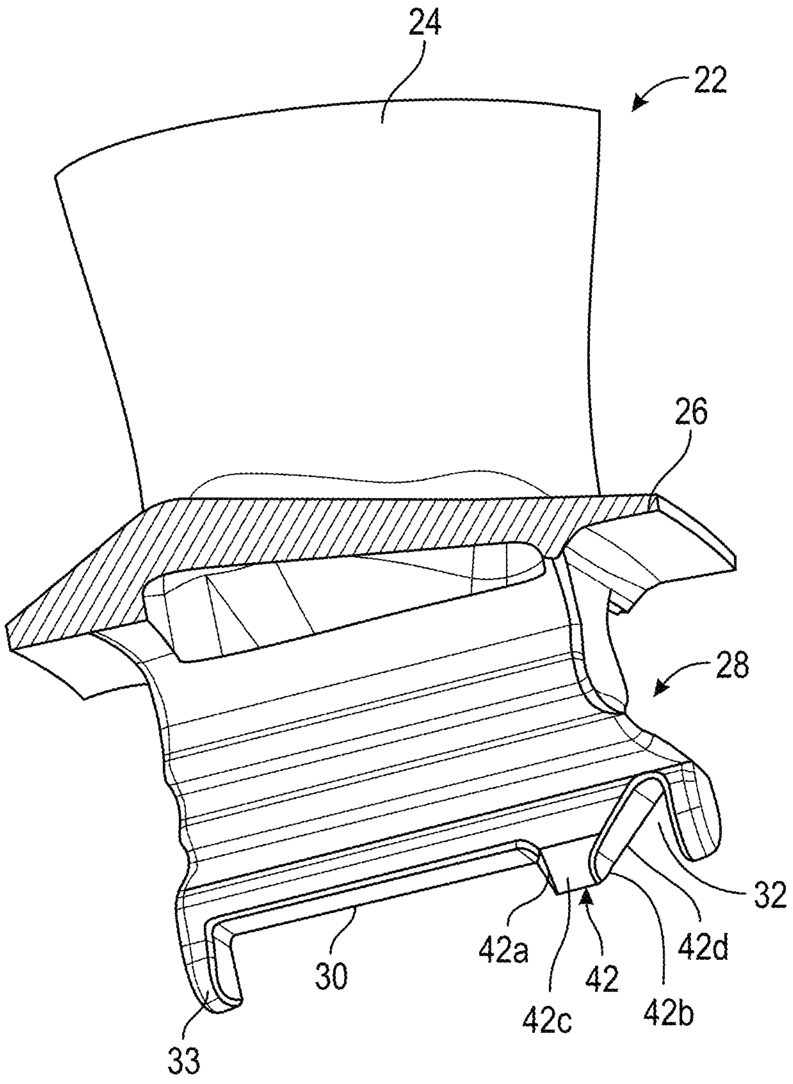
FIG. 8 is a schematic perspective view of a vane for a rotor wheel according to the disclosure.

The root 28 of each vane 22 comprises a lobe 30 at its radially internal end, a first axial end of which, in this case downstream, comprises a circumferential notch 32, and a second axial end of which, in this case upstream, comprises a radially inwardly directed cleat 33 or hook (see FIG. 8).

The rotor wheel 10 also comprises a split annular ring 34 engaged in the notches 32 in the vanes and pressed axially against the disc 12, and in particular against a downstream face 12*a* of the disc 12.

When the ring 34 is engaged in the notches 32 in the vanes, these vanes 22 are intended to be supported by their own cleats 33 on an upstream face 12*b* of the disc 12. The ring 34 rests axially on one face 12*a* of the disc 12 and the cleats 33 rest axially on the opposite face 12*b* of the disc. In theory, this axial support is provided by the assembly of the ring 34.

Each of the vanes 22 is mounted on the external periphery of the disc 12 by a "slide" connection. Once fitted, the vanes 22 must be held axially on the disc 12 and the ring 34 ensures this immobilisation. It is also important to ensure that this connection is watertight, in particular to prevent gases from the duct of the rotor from flowing through this connection.

According to the disclosure, this sealing is ensured even if the vane 22 moves axially during operation as a function of the assembly clearances, i.e. whatever the axial position of the vane 22 in the corresponding slot 14. This is made possible by the fact that the lobe 30 of the root 28 of each of the vanes 22 comprises, between the notch 32 and the cleat 33, a projecting bulb 42 which is oriented radially inwards and configured to bear in a sealed radial manner or to be adjusted in a radial direction on the bottom 14*a* of the corresponding slot 14.

Figure 9:
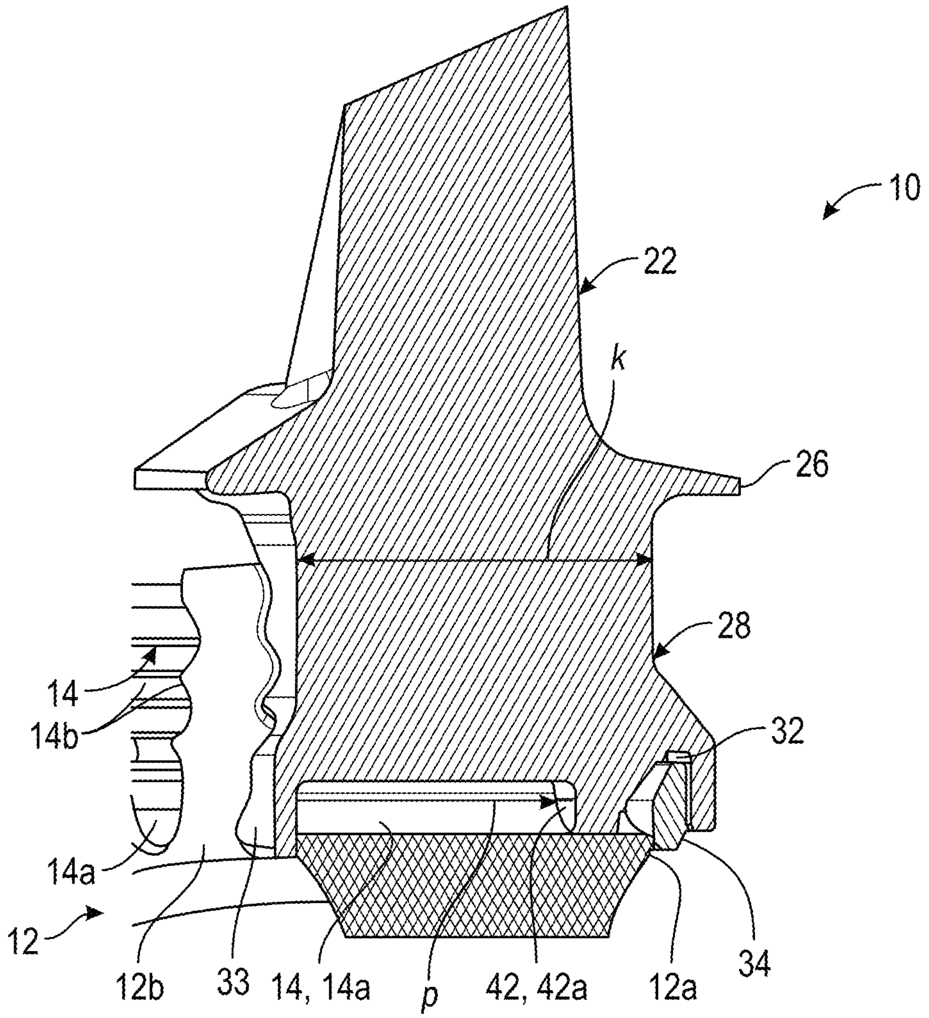
FIG. 9 is a schematic axial sectional perspective view of the rotor wheel comprising the vane shown in FIG. 8.

As can be seen in FIGS. 8 and 9 in particular, the bulb 42 preferably has in cross-section a shape complementary to a cross-section of a portion of the slot 14 in which it is located.

In the example shown, the bulb 42 comprises an upstream radial face 42*a* and a downstream radial face 42*b*. These faces 42*a*, 42*b* are connected together by a convex curved surface 42*c* complementary to the bottom 14*a* of the slot 14 and bearing radially or fitted against this bottom 14.

The downstream face 42*b* is connected to the notch 32 by a face 42*d* which is inclined in the example shown. In this way, the face 42*d* allows to facilitate the machining of the bulb 42.

Figure 10:
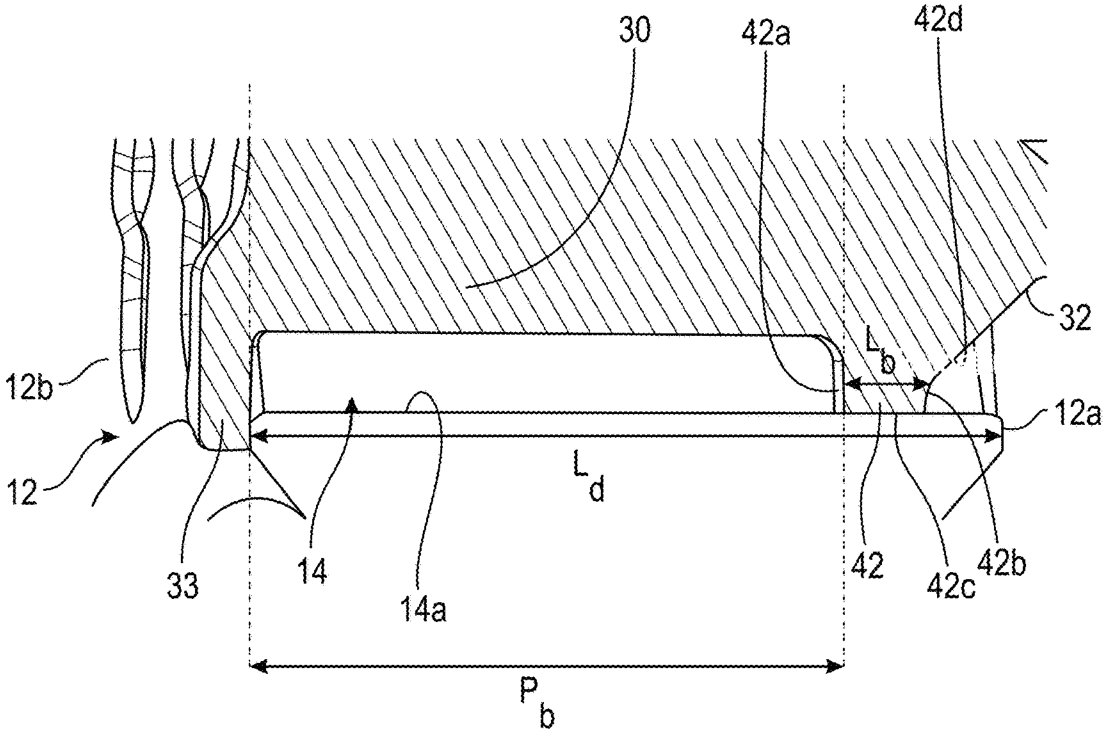
FIG. 10 is a larger scale view of a portion of FIG. 9.

FIG. 10 illustrates the axial position of the bulb 42 on the root 28 or the lobe 30, measured along the axis A and from the face 12*b* of the disc 12 on which the cleat 33 or hook of the vane rests. The axial position Pb is such that:

$$(p/k)_1 < Pb < (p/k)_2$$

with p is the axial position of the bulb on the vane root (measured along axis A), k is the axial length of the vane root (measured along the axis A), $(p/k)_1$ may be greater than or equal to 0.1 or 0.7, and $(p/k)_2$ may be less than or equal to 0.9 or 0.3.

In particular, the parameters $(p/k)_1$ and $(p/k)_2$ indicate a range of values (without units of measurement) for an axial position of the bulb Pb. The range of values for the parameters $(p/k)_1$ and $(p/k)_2$ can correspond to the axial position of the bulb in relation to the axial length of the vane root. This range of values can be between 0.1 and 0.9.

Advantageously, the axial position Pb is between 0.1 and 0.3 and/or between 0.7 and 0.9. This allows to facilitate the machining of the bulb 42, for example by a grinding wheel, which does not interfere with the cleat 33. In this way, the machining of the bulb is more precise and allows to significantly strengthen the sealing between the bulb and the bottom of the slot. By way of example, FIG. 9 shows the bulb 42 having an axial position of between 0.7 and 0.9. In the example shown, the bulb 42 has an axial position Pb such that it is closer to the first end of the root comprising the notch 32, than to the second end of the root comprising the cleat 33 or hook.

The bulb 42 has an axial length Lb such that:

$$0.1 \times Ld < Lb < 0.9 \times Ld$$

with

Ld the broaching length of the disc, which is equal to the maximum length of a slot 14.

Figure 12:
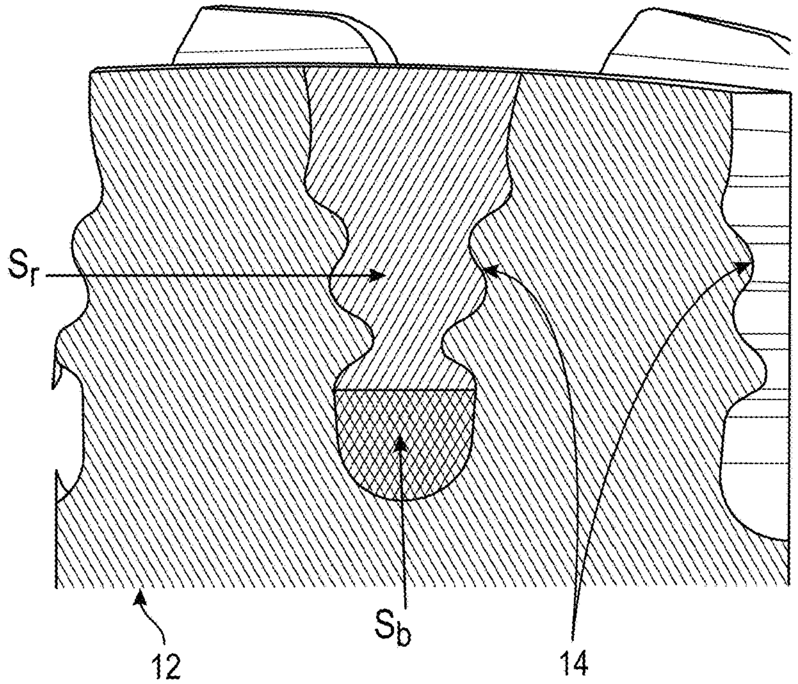
FIG. 12 is a partial schematic perspective view of a disc and shows the cross-sectional areas of the root of a vane housed in one of the slots of the disc.

By way of example, FIGS. 11 and 12 show that the cross-sectional shape of the bulb 42 is complementary to the cross-sectional shape of the slot 14 in which the bulb 42 is located. In this case, the area in the bulb Sb can be defined as:

$$Sb = (St - Sr)$$

with

St=the total area of a cross-section of a slot of the disc (FIG. 11), and

Sr=the area of a cross-section of the root outside the bulb without passing through the bulb (FIG. 12).

Preferably, the bulb 42 located in the slot 14 may not have an exactly complementary cross-sectional shape.

The area of the bulb Sb can be defined as:

$$0.01 \times (St - Sr) < Sb < 0.9 \times (St - Sr)$$

with

St=the total area of a cross-section of a slot of the disc (FIG. 11), and

Sr=the area of a cross-section of the root outside the bulb without passing through the bulb.

The sealing obtained in this way is said to be radial, as it is no longer achieved by a flat bearing of the cleat or hook against the disc. A vane as described above can be manufactured as follows:

The root of the vane is machined by a conventional grinding, the bulb is produced using conventional grinding equipment but, compared with the rest of the root, with a different grinding wheel shape and a different tool path due to the interference of the shapes in the broaching axis, The slots of the disc are machined by broaching or EDM wire cutting.

The invention claimed is:

1. A rotor wheel for an aircraft turbine engine, the wheel comprising:

a disc having a main axis (A) and slots at an external periphery, the slots extending along said axis and each comprising a bottom and two lateral flanks;

vanes mounted in the slots of the disc, each vane comprising a blade connected by a platform to a root that is configured to be mounted in a form-fitting manner in one of the slots, the root of each of the vanes comprising, at a radially internal end, a lobe, a first axial end of which comprises a circumferential notch and a second axial end of which, opposite the first end, comprises a cleat oriented radially inwards and configured to bear axially against a first face of the disc; and a split annular ring engaged in the notches of the vanes and pressed axially against a second face of the disc, the second face being opposite the first face, wherein the lobe of the root of each of the vanes comprises, between said first and second ends, a projecting bulb that is oriented radially inwards and has a surface configured to bear radially against the bottom of the corresponding slot, wherein said bulb comprises two radial faces, respectively upstream and downstream, which are connected together by a convex curved face complementary to the bottom of the slot, and wherein the downstream radial face of the bulb is connected by an inclined face to said notch.

2. The rotor wheel according to claim 1, wherein said bulb has in cross-section a shape complementary to a cross-section of a portion of the slot in which it is located.

3. The rotor wheel according to claim 1, wherein said bulb has an axial position Pb on said lobe, measured along the main axis (A) and from the face of the disc on which said cleat of the vane bears, such that:

$$(p/k)_1 < Pb < (p/k)_2$$

wherein:

p is an axial position of the bulb on the vane root, k is an axial length of the vane root, $(p/k)_1$ is greater than or equal to 0.1, and $(p/k)_2$ is less than or equal to 0.9.

4. The rotor wheel according to claim 3, wherein said bulb has the axial position Pb such that the bulb is closer to said first end than to said second end.

5. The rotor wheel according to claim 1, wherein said bulb has an axial length Lb such that:

$$0.1\times Ld<Lb<0.9\times Ld$$

wherein:

Ld is a broaching length of the disc, which is equal to a maximum length of one of the slots.

6. The rotor wheel according to claim 1, wherein said bulb has in cross-section an area Sb such that:

$$0.01\times(St-Sr)<Sb<0.9\times(St-Sr)$$

wherein:

St=a total area of a cross-section of a slot of the disc, and

Sr=an area of a cross-section of the root outside to the bulb without passing through the bulb.

7. A turbine engine for an aircraft, comprising the rotor wheel according to claim 1.

8. The rotor wheel according to claim 3, wherein $(p/k)_1$ is greater than or equal to 0.7.

* * * * *